US012062476B2

(12) United States Patent
Jeong

(10) Patent No.: US 12,062,476 B2
(45) Date of Patent: Aug. 13, 2024

(54) CHIP ELECTRONIC COMPONENT AND BOARD HAVING THE SAME

(71) Applicant: SAMSUNG ELECTRO-MECHANICS CO., LTD., Suwon-si (KR)

(72) Inventor: Dong Jin Jeong, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 18/120,055

(22) Filed: Mar. 10, 2023

(65) Prior Publication Data

US 2023/0215610 A1 Jul. 6, 2023

Related U.S. Application Data

(63) Continuation of application No. 16/992,329, filed on Aug. 13, 2020, now Pat. No. 11,626,233, which is a (Continued)

(30) Foreign Application Priority Data

Oct. 14, 2014 (KR) ........................ 10-2014-0138590

(51) Int. Cl.

*H01F 17/00* (2006.01)
*H01F 17/04* (2006.01)

(Continued)

(52) U.S. Cl.

CPC ..... *H01F 17/0013* (2013.01); *H01F 17/0006* (2013.01); *H01F 17/06* (2013.01);

(Continued)

(58) Field of Classification Search

CPC .... H01F 17/0013; H01F 17/006; H01F 17/06; H01F 27/292; H01F 2017/0073; H01F 2017/048

(Continued)

(56) References Cited

U.S. PATENT DOCUMENTS

| | | | |
|---|---|---|---|
| 4,613,843 | A | 9/1986 | Esper et al. |
| 4,873,757 | A | 10/1989 | Williams |

(Continued)

FOREIGN PATENT DOCUMENTS

| | | | |
|---|---|---|---|
| CN | 103366920 | A | 10/2013 |
| CN | 103645451 | A | 3/2014 |

(Continued)

OTHER PUBLICATIONS

Final Office Action dated Sep. 11, 2018 issued in U.S. Appl. No. 14/691,285.

(Continued)

*Primary Examiner* — Shawki S Ismail
*Assistant Examiner* — Joselito S. Baisa
(74) *Attorney, Agent, or Firm* — MORGAN, LEWIS & BOCKIUS LLP

(57) ABSTRACT

There are provided a chip electronic component and a board having the same. The chip electronic component includes: a substrate; a first internal coil part disposed on one surface of the substrate; a second internal coil part disposed on the other surface of the substrate opposing one surface thereof; a via penetrating through the substrate to connect the first and second internal coil parts to each other; and first and second via pads disposed on one surface and the other surface of the substrate, respectively, to cover the via, wherein the first and second via pads are extended in a direction toward portions of the first and second internal coil parts adjacent thereto.

8 Claims, 5 Drawing Sheets

Related U.S. Application Data continuation of application No. 16/730,399, filed on Dec. 30, 2019, now Pat. No. 11,469,030, which is a continuation of application No. 16/212,541, filed on Dec. 6, 2018, now Pat. No. 10,553,338, which is a continuation of application No. 14/691,285, filed on Apr. 20, 2015, now abandoned.

(51) Int. Cl.
*H01F 17/06* (2006.01)
*H01F 27/29* (2006.01)

(52) U.S. Cl.
CPC ... *H01F 27/292* (2013.01); *H01F 2017/0073* (2013.01); *H01F 2017/048* (2013.01)

(58) Field of Classification Search
USPC .......................................................... 336/200
See application file for complete search history.

(56) References Cited

U.S. PATENT DOCUMENTS

| | | | |
|---|---|---|---|
| 4,904,967 A | 2/1990 | Morii et al. | |
| 5,321,380 A | 6/1994 | Godek et al. | |
| 5,337,063 A | 8/1994 | Takahira | |
| 5,353,001 A | 10/1994 | Meinel et al. | |
| 5,398,400 A | 3/1995 | Breen | |
| 5,515,022 A | 5/1996 | Tashiro et al. | |
| 5,929,733 A | 7/1999 | Anzawa et al. | |
| 6,000,128 A | 12/1999 | Umeno et al. | |
| 6,073,339 A | 6/2000 | Levin | |
| 6,091,607 A | 7/2000 | McKeown et al. | |
| 6,342,681 B1 | 1/2002 | Goldberger et al. | |
| 6,388,551 B2 | 5/2002 | Morikawa | |
| 6,618,929 B2 | 9/2003 | Kitamura | |
| 6,710,694 B2 | 3/2004 | Matsuta et al. | |
| 6,727,571 B2 | 4/2004 | Sugiyama et al. | |
| 6,791,158 B2 * | 9/2004 | Lemaire | H01L 23/5227 257/528 |
| 6,914,508 B2 | 7/2005 | Ferencz et al. | |
| 7,046,114 B2 | 5/2006 | Sakata | |
| 7,362,205 B2 | 4/2008 | Ito et al. | |
| 7,378,931 B2 | 5/2008 | Odahara et al. | |
| 7,551,052 B2 | 6/2009 | Jow et al. | |
| 7,646,304 B2 | 1/2010 | Cote et al. | |
| 7,876,572 B2 | 1/2011 | Sota | |
| 7,974,103 B2 | 7/2011 | Lim et al. | |
| 8,093,996 B2 | 1/2012 | Heurtier | |
| 8,334,747 B2 | 12/2012 | Matsumoto | |
| 8,339,802 B2 | 12/2012 | Lotfi et al. | |
| 9,027,229 B2 | 5/2015 | Thorslund | |
| 9,035,740 B2 | 5/2015 | Washizaki et al. | |
| 9,076,585 B2 | 7/2015 | Yang et al. | |
| 9,875,837 B2 | 1/2018 | Jeong et al. | |
| 9,960,176 B2 | 5/2018 | Wu | |
| 10,123,420 B2 | 11/2018 | Lee | |
| 10,147,540 B2 | 12/2018 | Tonoyama et al. | |
| 10,170,229 B2 | 1/2019 | Jeong | |
| 10,256,032 B2 | 4/2019 | Jeong | |
| 10,515,750 B2 | 12/2019 | Jeong | |
| 10,956,032 B2 | 3/2021 | Valade | |
| 11,217,381 B2 | 1/2022 | Li et al. | |
| 11,694,837 B2 * | 7/2023 | Yamada | H01F 41/041 336/200 |
| 2003/0076211 A1 | 4/2003 | Matsuta et al. | |
| 2003/0098496 A1 | 5/2003 | Sugiyama et al. | |
| 2003/0179067 A1 * | 9/2003 | Gamou | H01F 27/2804 336/223 |
| 2006/0214759 A1 | 9/2006 | Kawari | |
| 2007/0238245 A1 | 10/2007 | Cote et al. | |
| 2008/0180206 A1 | 7/2008 | Fouquet et al. | |
| 2008/0278275 A1 | 11/2008 | Fouquet et al. | |
| 2009/0160719 A1 | 6/2009 | Kato et al. | |
| 2009/0231139 A1 | 9/2009 | Heurtier | |
| 2009/0243782 A1 | 10/2009 | Fouquet et al. | |
| 2009/0243783 A1 | 10/2009 | Fouquet et al. | |
| 2009/0251131 A1 | 10/2009 | Myers et al. | |
| 2010/0020448 A1 | 1/2010 | Ng et al. | |
| 2010/0025682 A1 | 2/2010 | Lee et al. | |
| 2010/0090327 A1 | 4/2010 | Ogata | |
| 2011/0095620 A1 | 4/2011 | Fouquet et al. | |
| 2012/0112866 A1 | 5/2012 | Matsumoto | |
| 2013/0120095 A1 | 5/2013 | Weatherspoon et al. | |
| 2013/0222101 A1 | 8/2013 | Ito et al. | |
| 2013/0249664 A1 | 9/2013 | Tonoyama et al. | |
| 2013/0265131 A1 | 10/2013 | Yang et al. | |
| 2013/0289412 A1 | 10/2013 | Corl et al. | |
| 2013/0300529 A1 | 11/2013 | Chang et al. | |
| 2014/0152118 A1 * | 6/2014 | Kim | H01F 27/2847 307/104 |
| 2014/0320252 A1 * | 10/2014 | Sun | H01L 23/66 336/200 |
| 2015/0279548 A1 * | 10/2015 | Ngo | H01F 41/041 336/200 |
| 2016/0104565 A1 | 4/2016 | Nishiyama | |
| 2016/0111194 A1 | 4/2016 | Jeong | |
| 2016/0111195 A1 | 4/2016 | Nishiyama | |
| 2016/0268039 A1 | 9/2016 | Park et al. | |
| 2016/0307689 A1 | 10/2016 | Jeong et al. | |
| 2018/0204663 A1 | 7/2018 | Lee et al. | |
| 2018/0204672 A1 * | 7/2018 | Mendoza Aguirre | H01F 41/041 |
| 2023/0109147 A1 * | 4/2023 | Peralta | H02J 7/0025 29/601 |

FOREIGN PATENT DOCUMENTS

| | | | |
|---|---|---|---|
| CN | 203596265 | U | 5/2014 |
| JP | H05-198439 | A | 8/1993 |
| JP | H07-086755 | A | 3/1995 |
| JP | H11-204337 | A | 7/1999 |
| JP | 2003-133135 | A | 5/2003 |
| JP | 2005-005298 | A | 1/2005 |
| JP | 2007-067214 | A | 3/2007 |
| KR | 10-2014-0089595 | A | 7/2014 |
| WO | 2011/010491 | A1 | 1/2011 |
| WO | 2013/070371 | A1 | 5/2013 |

OTHER PUBLICATIONS

Non-Final Office Action dated Feb. 16, 2018 issued in U.S. Appl. No. 14/691,285.

Notice of Office Action issued in corresponding Korean Patent Application No. 10-2014-0138590, issued on May 22, 2017, with English translation.

Non-Final Office Action dated Jul. 17, 2017 issued in U.S. Appl. No. 14/691,285.

First Office Action issued in Chinese Patent Application No. 201505368620 dated Feb. 21, 2017, with English translation.

Final Office Action dated Feb. 23, 2017 issued in U.S. Appl. No. 14/691,285.

Non-Final Office Action dated Jul. 20, 2016 issued in U.S. Appl. No. 14/691,285.

Notice of Allowance issued in U.S. Appl. No. 16/212,541 dated Oct. 3, 2019.

Non-Final Office Action issued in U.S. Appl. No. 16/212,541 dated Apr. 11, 2019.

U.S. Office Action dated Jan. 21, 2022 issued in U.S. Appl. No. 16/730,399.

Notice of Allowance issued in corresponding U.S. Appl. No. 16/992,329 dated Dec. 13, 2022.

Final Office Action issued in corresponding U.S. Appl. No. 16/992,329 dated Jun. 22, 2022.

Office Action issued in corresponding U.S. Appl. No. 16/992,329 dated Jan. 21, 2022.

* cited by examiner

CHIP ELECTRONIC COMPONENT AND BOARD HAVING THE SAME

CROSS-REFERENCE TO RELATED APPLICATION

This application is the continuation application of U.S. patent application Ser. No. 16/992,329, filed on Aug. 13, 2020, which is the continuation application of U.S. patent application Ser. No. 16/730,399, filed on Dec. 30, 2019, now U.S. Pat. No. 11,469,030, which is the continuation application of U.S. patent application Ser. No. 16/212,541, filed on Dec. 6, 2018, now U.S. Pat. No. 10,553,338, which is the continuation application of U.S. patent application Ser. No. 14/691,285, filed on Apr. 20, 2015, now abandoned, which in turn claims the priority and benefit of Korean Patent Application No. 10-2014-0138590 filed on Oct. 14, 2014, the disclosures of which are incorporated herein by reference.

BACKGROUND

The present disclosure relates to a chip electronic component and a board having the same.

An inductor, a chip electronic component, is a representative passive element configuring an electronic circuit, together with a resistor and a capacitor to remove noise. Such an inductor is commonly combined with a capacitor in consideration of respective electromagnetic characteristics thereof to configure a resonance circuit amplifying a signal in a specific frequency band, a filter circuit, or the like.

Recently, as information technology (IT) devices such as communications devices, display devices, and the like, have been increasingly thinned and miniaturized, research into technologies facilitating the miniaturizing and thinning of various elements such as inductors, capacitors, transistors, and the like, used in such IT devices, has been continuously undertaken.

In this regard, inductors have been rapidly replaced by chips having a small size and high density, capable of being automatically surface-mounted, and a thin film type inductor in which coil patterns formed of a mixture of a magnetic powder and a resin are formed on upper and lower surfaces of a thin film insulating substrate by plating have been developed.

The thin film type inductor as described above may be manufactured by forming a coil pattern on a substrate and then covering an the exterior thereof with a magnetic material.

Meanwhile, in order to thin and miniaturize inductors, limitations in shape of existing connection portions between coil patterns must be overcome.

More specifically, in a substrate plating process for forming the coil pattern of the inductor, a conductive coil pattern may be formed on one surface of the substrate and on the other surface of the substrate.

The conductive coil patterns formed on one surface and the other surface of the substrate may be electrically connected to each other by a via electrode formed in the substrate.

The via electrode and the conductive coil pattern are generally positioned in a linear manner, and relatively large pads are formed to prevent defects caused by misalignment of a via portion, causing a problem in manufacturing an inductor having a small size and high inductance.

In addition, as the pad may be positioned to be adjacent to a core forming inductance, an internal core area may be decreased, such that there may be significant limitations in miniaturization.

Therefore, there remains a need to design an inductor capable of securing a sufficient amount of inductance while having a small size.

RELATED ART DOCUMENT (Patent Document 1) Japanese Patent Laid-Open Publication No. 2007-067214

SUMMARY

An aspect of the present disclosure may provide a chip electronic component in which a loss of inductance due to an area of a via pad is prevented through altering a shape and a position of the via pad.

According to an aspect of the present disclosure, a chip electronic component may include: a substrate; a first internal coil part disposed on one surface of the substrate; a second internal coil part disposed on the other surface of the substrate opposing one surface of the substrate; a via penetrating through the substrate to connect the first and second internal coil parts to each other; and first and second via pads disposed on one surface and the other surface of the substrate, respectively, to cover the via, wherein portions of the first and second via pads are extended in a direction toward first and second internal coil parts adjacent thereto.

According to another aspect of the present disclosure, a board having a chip electronic component may include: a printed circuit board on which first and second electrode pads are provided; and the chip electronic component as described above, mounted on the printed circuit board.

BRIEF DESCRIPTION OF DRAWINGS

The above and other aspects, features and advantages of the present disclosure will be more clearly understood from the following detailed description taken in conjunction with the accompanying drawings, in which.

DETAILED DESCRIPTION

Figure 1:
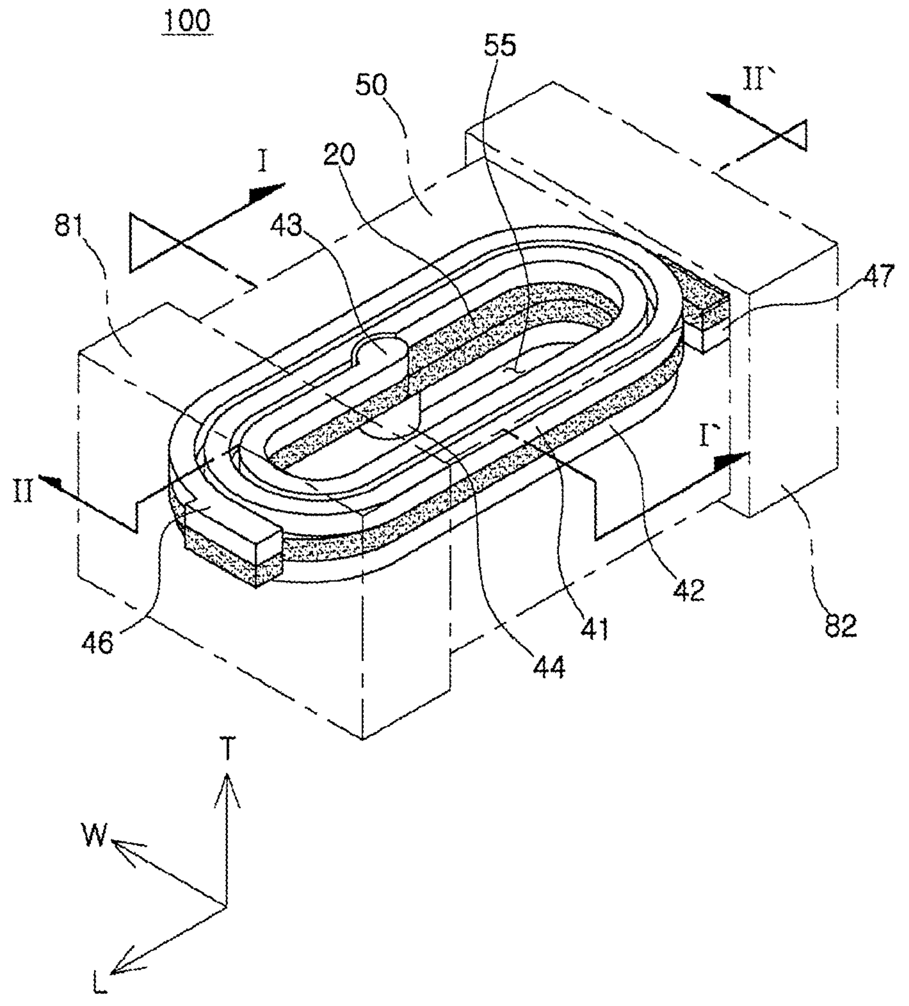
FIG. 1 is a schematic perspective view of a chip electronic component including internal coil parts according to an exemplary embodiment of the present disclosure.

Exemplary embodiments of the present disclosure will now be described in detail with reference to the accompanying drawings.

The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

Chip Electronic Component

Hereinafter, a chip electronic component according to an exemplary embodiment of the present disclosure will be described. Particularly, a thin film type inductor will be described, but the present disclosure is not limited thereto.

FIG. 1 is a schematic perspective view showing a chip electronic component including internal coil parts according to an exemplary embodiment of the present disclosure.

Referring to FIG. 1, as an example of the chip electronic component, a thin film type inductor used in a power line of a power supply circuit is disclosed.

The chip electronic component 100 according to an exemplary embodiment of the present disclosure may include a magnetic body 50, internal coil parts 41 and 42 buried in the magnetic body 50, and first and second external electrodes 81 and 82 disposed on an outer portion of the magnetic body 50 to thereby be electrically connected to the internal coil parts 41 and 42.

In the chip electronic component 100 according to an exemplary embodiment of the present disclosure, a 'length' direction refers to an 'L' direction of FIG. 1, a 'width' direction refers to a 'W' direction of FIG. 1, and a 'thickness' direction refers to a 'T' direction of FIG. 1.

The magnetic body 50 may form the exterior of the chip electronic component 100 and may be formed of any material capable of exhibiting magnetic characteristics. For example, the magnetic body 50 may be formed by filling ferrite or magnetic metal powder.

Examples of the ferrite may include Mn—Zn based ferrite, Ni—Zn based ferrite, Ni—Zn—Cu based ferrite, Mn—Mg based ferrite, Ba based ferrite, Li based ferrite, or the like.

The magnetic metal powder may contain any one or more selected from the group consisting of Fe, Si, Cr, Al, and Ni. For example, the magnetic metal powder may contain Fe—Si—B—Cr-based amorphous metal, but the present disclosure is not necessarily limited thereto.

The magnetic metal powder may have a particle diameter of 0.1 μm to 30 μm and be contained in a form in which the magnetic metal powder is dispersed in a thermosetting resin such as an epoxy resin, polyimide, or the like.

A first internal coil part 41 having a coil shape may be formed in one surface of a substrate 20 disposed in the magnetic body 50, and a second internal coil part 42 having a coil shape may be formed on the other surface opposing one surface of the substrate 20.

The first and second internal coil parts 41 and 42 may be formed in a spiral shape and be formed by performing an electroplating method.

Examples of the substrate 20 may include a polypropylene glycol (PPG) substrate, a ferrite substrate, a metal-based soft magnetic substrate, and the like.

A central portion of the substrate 20 may be penetrated to thereby form a hole, and the hole is filled with a magnetic material to thereby form a core part 55.

As the core part 55 filled with the magnetic material is formed, inductance Ls may be improved.

Figure 2:
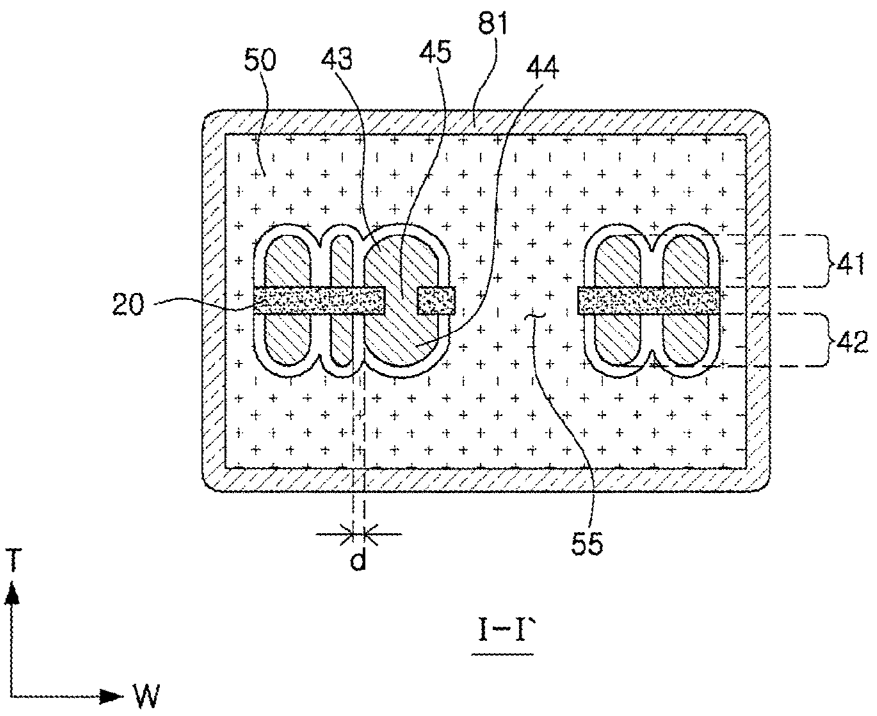
FIG. 2 is a cross-sectional view taken along line I-I' of FIG. 1.

FIG. 2 is a cross-sectional view taken along line I-I' of FIG. 1.

Referring to FIG. 2, the first and second internal coil parts 41 and 42 formed on one surface and the other surface of the substrate 20 may be connected to a via 45 penetrating through the substrate 20.

First and second via pads 43 and 44 may be formed on one surface and the other surface of the substrate 20, respectively, to cover the via 45.

The first via pad 43 may be formed by extending one end portion of the first internal coil part 41, and the second via pad 44 may be formed by extending one end portion of the second internal coil part 42.

The first and second via pads 43 and 44 may be formed by performing an electroplating method similarly to the first and second internal coil parts 41 and 42.

In general, a via is positioned on a straight line with an internal coil portion, and an open defect due to misalignment of the via may occur.

In the case of forming a via pad in order to prevent the open defect as described above, there is a tendency to increase an area of the via pad, which limits implementation of miniaturization and high inductance of a chip electronic component.

Meanwhile, as the via pad having a large area as described above is also disposed in a direction toward a core implementing inductance (Ls), an area of an internal core part is decreased, such that inductance may be decreased in a process of miniaturizing the chip electronic component.

That is, as the area of the via pad is increased, the area of the core part may be decreased, and a magnetic material filled in the core part may be decreased, such that inductance (Ls) characteristics may be decreased.

According to an exemplary embodiment of the present disclosure, in order to solve the above-mentioned problems, the first and second via pads 43 and 44 may be extended in a direction toward portions of the first and second internal coil parts 41 and 42 adjacent thereto.

Figure 3A:
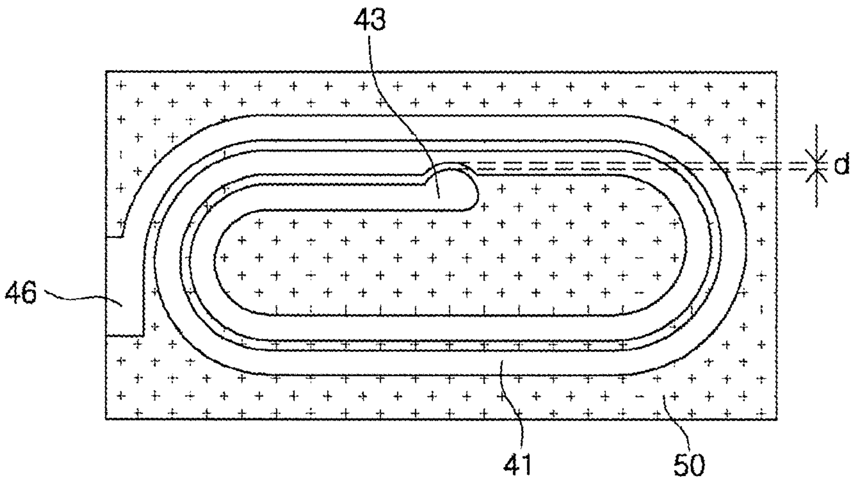
FIGS. 3A and 3B are schematic plan views of via pads according to an exemplary embodiment of the present disclosure.
Figure 3B:
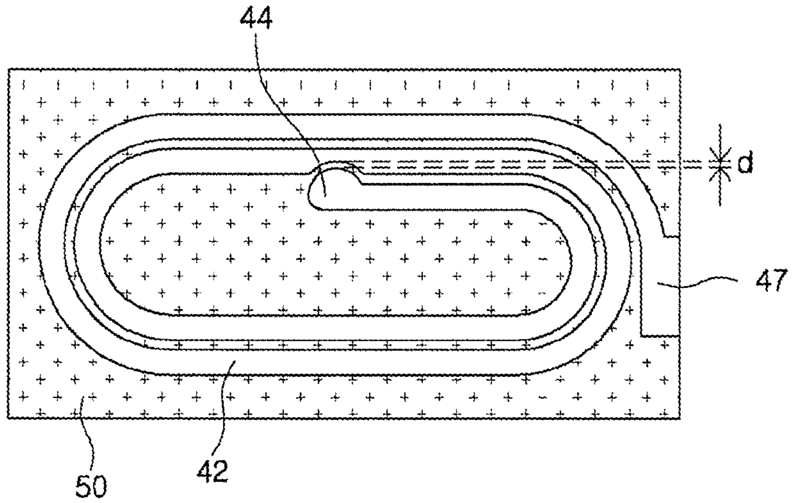

FIGS. 3A and 3B are schematic plan views showing the via pads according to an exemplary embodiment of the present disclosure.

Referring to FIGS. 3A and 3B, it may be appreciated that the first and second via pads 43 and 44 are extended in the direction toward the portions of first and second internal coil parts 41 and 42 adjacent thereto.

Shapes of the first and second via pads 43 and 44 are not limited, but generally, the first and second via pads 43 and 44 may have a circular shape to be equal to a shape of the via.

The first and second via pads 43 and 44 may be disposed to be biased towards the first and second internal coil parts 41 and 42, unlike a disposition shape of a general product.

Since the first and second via pads 43 and 44 are disposed as described above, the area of the core part 45 may be increased as compared to the related art, and the magnetic material filled in the core part is increased, such that inductance (Ls) characteristics may be improved.

In addition, the open defect that electric connection is cut due to the via 45 and the via pads 43 and 44 that are not aligned to coincide with each other but are misaligned may be prevented, and the area of the core part 55 in which the magnetic material is filled may be secured as much as possible, such that high inductance (Ls) may be secured.

The portions of the first and second internal coil parts 41 and 42 adjacent to the first and second via pads 43 and 44 are formed as recessed portions to be insulated from the first and second via pads 43 and 44.

That is, according to an exemplary embodiment of the present disclosure, the first and second via pads 43 and 44 are extended in the direction toward the portions of the first and second internal coil parts 41 and 42 adjacent thereto in order to implement high inductance (Ls) of the chip electronic component, such that a short-circuit defect may occur.

Therefore, in order to prevent the short-circuit defect, the recessed portions may be formed in the portions of the first and second internal coil parts 41 and 42 adjacent to the first and second via pads 43 and 44.

The shapes of the recessed portions are not particularly limited as long as the recessed portions are formed to insulate the first and second internal coil parts 41 and 42 and the first and second via pads 43 and 44 from each other.

According to an exemplary embodiment of the present disclosure, the centers of the recessed portions and the centers of the first and second via pads 43 and 44 may coincide with each other.

That is, the recessed portions may have a shape in which the recessed portions are equally divided based on the first and second via pads 43 and 44.

Meanwhile, according to an exemplary embodiment of the present disclosure, an interval d between the first and second via pads 43 and 44 and the first and second internal coil parts 41 and 42 adjacent thereto may be 3 μm or more, but is not necessarily limited thereto.

The first and second internal coil parts 41 and 42 adjacent to the first and second via pads 43 and 44 may be insulated from the first and second via pads 43 and 44 by adjusting the interval d between the first and second via pads 43 and 44 and the first and second internal coil parts 41 and 42 adjacent thereto to be 3 μm or more.

In the case in which the interval d between the first and second via pads 43 and 44 and the first and second internal coil parts 41 and 42 adjacent thereto is less than 3 μm, a short-circuit defect may occur.

According to an exemplary embodiment of the present disclosure, since the first and second via pads 43 and 44 are disposed to be biased toward the first and second internal coil parts 41 and 42, the area of the core part 55 may be increased as compared to the related art, and accordingly, the magnetic material filled in the core part may be increased, thereby improving inductance (Ls) characteristics.

That is, even though the chip electronic component is miniaturized, the area of the core part may be secured to be large due to the disposition of the via pad as described above, such that the filled magnetic material may be increased, and accordingly, high inductance chip electronic component may be implemented.

The first and second internal coil parts 41 and 42, the via 45, and the first and second via pads 43 and 44 may be formed of a metal having excellent electric conductivity. For example, the first and second internal coil parts 41 and 42, the via 45, and the first and second via pads 43 and 44 may be formed of silver (Ag), palladium (Pd), aluminum (Al), nickel (Ni), titanium (Ti), gold (Au), copper (Cu), platinum (Pt), an alloy thereof, or the like.

Figure 4:
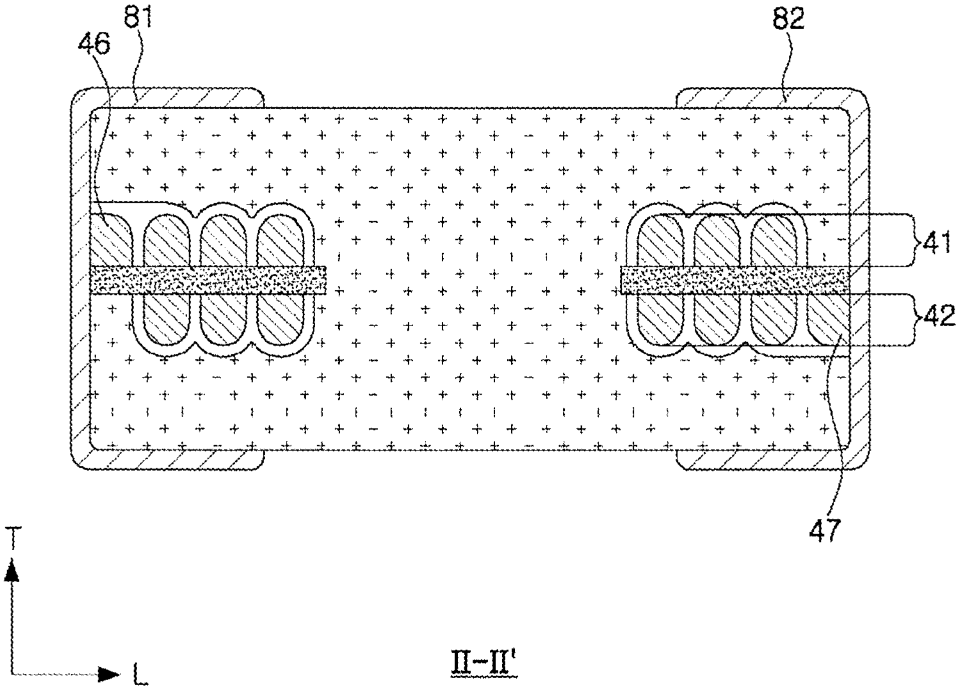
FIG. 4 is a cross-sectional view taken along line II-II' of FIG. 1.

FIG. 4 is a cross-sectional view taken along line II-II' of FIG. 1.

Referring to FIG. 4, the other end portion of the first internal coil part 41 may be extended to form a first lead portion 46 exposed to one end surface of the magnetic body 50 in the length (L) direction, and the other end portion of the second internal coil part 42 may be extended to form a second lead portion 47 exposed to the other end surface of the magnetic body 50 in the length (L) direction.

However, the present disclosure is not necessarily limited thereto, but the first and second lead portions 46 and 47 may be exposed to at least one surface of the magnetic body 50.

The first and second external electrodes 81 and 82 may be disposed on both end surfaces of the magnetic body 50 in the length (L) direction to be connected to the first and second lead portions 46 and 47 exposed to both end surfaces of the magnetic body 50 in the length (L) direction, respectively.

The first and second external electrodes 81 and 82 may be formed of a metal having excellent electric conductivity. For example, the first and second external electrodes 81 and 82 may be formed of one of nickel (Ni), copper (Cu), tin (Sn), silver (Ag), and the like, an alloy thereof, or the like.

Board Having Chip Electronic Component

Figure 5:
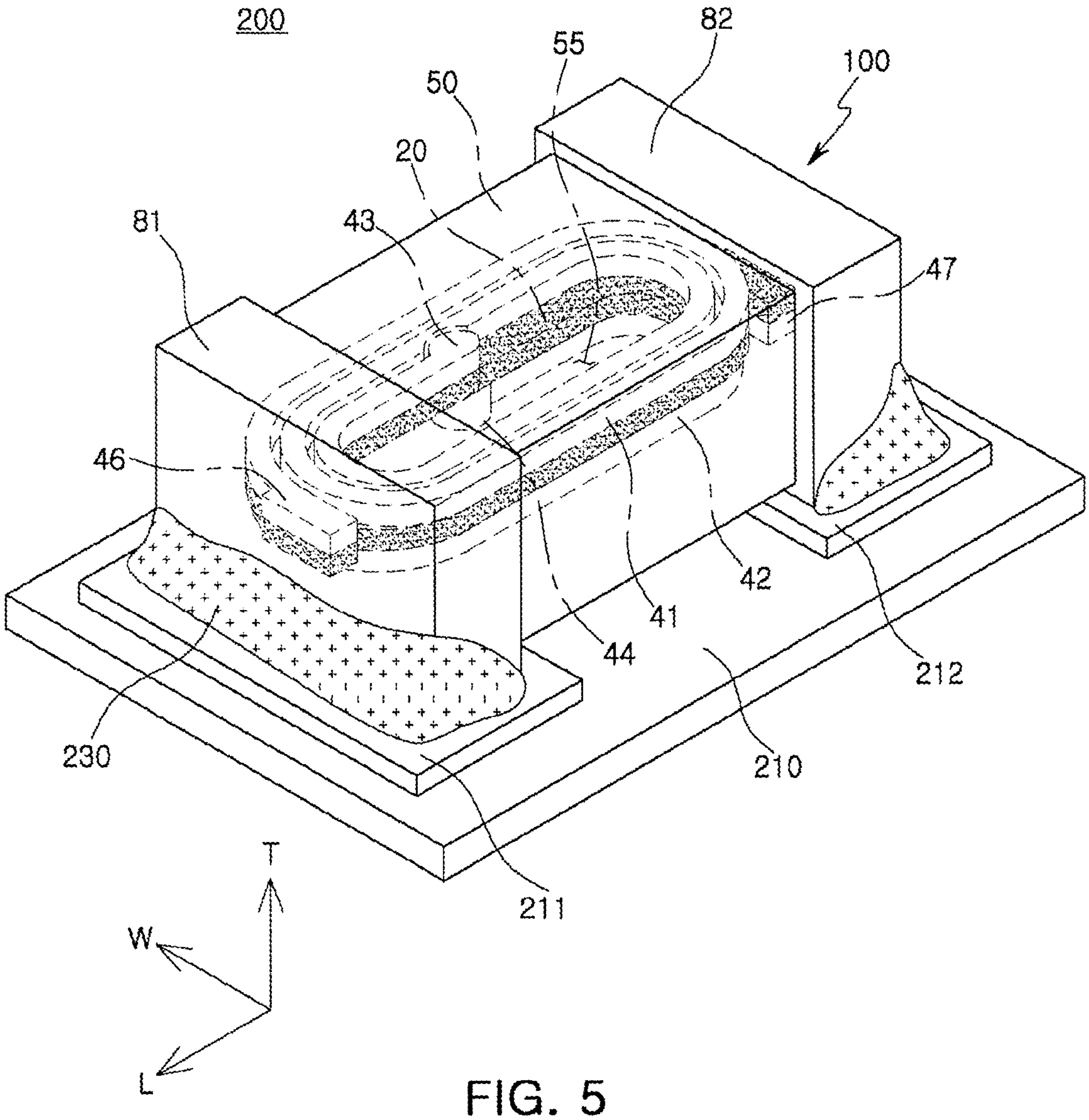
FIG. 5 is a perspective view showing a board in which the chip electronic component of FIG. 1 is mounted on a printed circuit board.

FIG. 5 is a perspective view of a board in which the chip electronic component of FIG. 1 is mounted on a printed circuit board.

Referring to FIG. 5, a board 200 having a chip electronic component 100 according to the present exemplary embodiment may include a printed circuit board 210 on which the chip electronic component 100 is mounted and first and second electrode pads 211 and 212 formed on the printed circuit board 210 to be spaced apart from each other.

In this case, the chip electronic component 100 may be electrically connected to the printed circuit board 210 by solders 230 in a state in which first and second external electrodes 81 and 82 are positioned on the first and second electrode pads 211 and 212 to contact the first and second electrode pads 221 and 222, respectively.

Internal coil parts 41 and 42 of the mounted chip electronic component 100 may be disposed horizontally with respect to a mounting surface of the printed circuit board 210.

Except for the description described above, a description of features overlapped with those of the above-mentioned chip electronic component according to an exemplary embodiment of the present disclosure will be omitted.

As set forth above, according to exemplary embodiments of the present disclosure, the area of the core may be sufficiently secured by disposing the via pad in the direction toward the coil adjacent to the via, such that a loss of the inductance caused by the area of the via pad may be prevented.

While exemplary embodiments have been shown and described above, it will be apparent to those skilled in the art that modifications and variations could be made without departing from the scope of the present invention as defined by the appended claims.

What is claimed is:

1. A coil component comprising:
a body;
a coil embedded in the body and including first and second coil parts, and a via connecting the first and second coil parts; and
first and second external electrodes disposed on at least one surface of the body and connected to respective ends of the coil,
wherein each of the first and second coil parts has a coil shaped conductor and a via pad overlapping the via,
the coil shaped conductor of at least one of the first and second coil parts has a middle turn having a width that is reduced in a region adjacent to the via pad and increased widths in respective regions on opposing sides of said region adjacent to the via pad, and an outer turn adjacent to the middle turn and having uniform width in the regions adjacent to the region of the middle turn having reduced width and to the respective regions having increased widths.

2. The coil component of claim 1, wherein the regions of the coil shaped conductors of the first and second coil parts having the reduced widths overlap with each other.

3. The coil component of claim 1, wherein the coil shaped conductor of each of the first and second coil parts forms a plurality of coil windings, and only one winding from among each plurality of coil windings has the reduced width in the region adjacent to the via pad.

4. The coil component of claim 3, wherein the coil shaped conductor of each of the first and second coil parts has a substantially constant width outside of the region of the one winding having the reduced width.

5. The coil component of claim 4, wherein the via pad of each of the first and second coil parts has a width greater than the substantially constant width of the coil shaped conductor outside of the region adjacent to the via pad.

6. The coil component of claim 1, wherein the region of the coil shaped conductor of each of the first and second coil parts adjacent to the via pad has a recess extending in a side thereof facing the via pad.

7. The coil component of claim 1, further comprising:

an insulating layer disposed in a spiral pattern between adjacent turns of the coil shaped conductor of each of the first and second coil parts, wherein the insulating layer deviates from the spiral pattern at a position adjacent to the via pad.

8. The coil component of claim 1, wherein the respective regions having increased widths of the middle turn have a substantially same width.

* * * * *